US012682562B1

(12) United States Patent
Bocamazo et al.

(10) Patent No.:  US 12,682,562 B1
(45) Date of Patent:      Jul. 14, 2026

(54) MACHINE LEARNING IMAGE-BASED ESTIMATION OF CONTAINER FULLNESS

(71) Applicant: Amazon Technologies, Inc., Seattle, WA (US)

(72) Inventors: Michael Robert Bocamazo, Framingham, MA (US); Siyao Hu, Grafton, MA (US); Yiwei Jiang, Worcester, MA (US); Frank Preiswerk, Brooklyn, NY (US); Timothy Stallman, Groton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 18/476,656

(22) Filed: Sep. 28, 2023

(51) Int. Cl.
*G06T 7/62* (2017.01)
*G06T 17/00* (2006.01)

(52) U.S. Cl.
CPC ................ *G06T 17/00* (2013.01); *G06T 7/62* (2017.01)

(58) Field of Classification Search
CPC .................................. G06T 17/00; G06T 7/62
USPC ......................................................... 345/419
See application file for complete search history.

(56) References Cited

U.S. PATENT DOCUMENTS

| | | | | |
|---|---|---|---|---|
| 9,864,911 B1 * | 1/2018 | Curlander | ............... | G01F 22/00 |
| 2009/0034792 A1 * | 2/2009 | Kennison | .................. | G06T 9/00 |
| | | | | 382/103 |

| | | | | |
|---|---|---|---|---|
| 2018/0247334 A1 * | 8/2018 | Paveletzke | ........... | G06Q 10/083 |
| 2023/0386059 A1 * | 11/2023 | Guizilini | ................... | G06T 7/50 |
| 2023/0406773 A1 * | 12/2023 | Schabel, Jr. | .......... | C04B 18/027 |
| 2024/0055101 A1 * | 2/2024 | Panetta | ................. | G06Q 10/06 |
| 2024/0112402 A1 * | 4/2024 | Astvatsaturov | ........ | G06V 20/64 |

OTHER PUBLICATIONS

Chang et al., "Matterport3D: Learning from RGB-D Data in Indoor Environments", International Conference on 3D Vision (3DV), Sep. 18, 2017, 14 pages.
Chang et al., "Pyramid Stereo Matching Network", Proceedings of the Institute of Electrical and Electronics Engineers Conference on Computer Vision and Pattern Recognition, 2018, 9 pages.
Chen et al., "Single-Image Depth Perception in the Wild", Proceedings of the 30th International Conference on Neural Information Processing Systems, Dec. 5, 2016, pp. 730-738.
Couprie et al., "Indoor Semantic Segmentation Using Depth Information", Available online at: https://arxiv.org/pdf/1301.3572.pdf, Jan. 15, 2013, pp. 1-8.

(Continued)

*Primary Examiner* — Samantha (Yuehan) Wang
(74) *Attorney, Agent, or Firm* — Kilpatrick Townsend & Stockton LLP

(57) ABSTRACT

Techniques are described herein for image-based determination of container fullness. An example method can include a computing system receiving, from an image-capturing device, a first two-dimensional image of a container including a first item. The computing system can determine, using a machine learning model, three dimensional information based at least in part on the two-dimensional image, the three dimensional information indicating a fullness of the container. The computing system can compare the fullness of the container to a target fullness of the container. The computing system can determine whether the fullness of the container exceeds the target fullness based at least in part on the comparison.

19 Claims, 12 Drawing Sheets

(56) References Cited

OTHER PUBLICATIONS

Dosovitskiy et al., "An Image is Worth 16×16 Words: Transformers for Image Recognition at Scale", Published as a conference paper at ICLR 2021, Jun. 2021, pp. 1-22.

Eigen et al., "Depth Map Prediction from a Single Image Using a Multi-Scale Deep Network", NIPS'14: Proceedings of the 27th International Conference on Neural Information Processing Systems, vol. 2, Jun. 9, 2014, pp. 1-9.

Erickson et al., "AutoGluon-Tabular: Robust and Accurate AutoML for Structured Data", Available online at: https://www.automl.org/wp-content/uploads/2020/07/AutoML_2020_paper_7.pdf, Mar. 13, 2020, 28 pages.

Fakoor et al., "Fast, Accurate, and Simple Models for Tabular Data via Augmented Distillation", NIPS'20: Proceedings of the 34th International Conference on Neural Information Processing Systems, Jun. 25, 2020, 20 pages.

Garg et al., "Unsupervised cnn for Single View Depth Estimation: Geometry to the Rescue", Computer Vision—ECCV, Oct. 11-14, 2016, 16 pages.

Ji et al., "3D Convolutional Neural Networks for Human Action Recognition", Institute of Electrical and Electronics Engineers Transactions on Pattern Analysis and Machine Intelligence, vol. 35, No. 1, Mar. 6, 2012, pp. 221-231.

Johnston et al., "Self-supervised Monocular Trained Depth Estimation Using Self-attention and Discrete Disparity Volume", Proceedings of the Institute of Electrical and Electronics Engineers /CVF conference on computer vision and pattern recognition, 2020, 14 pages.

Jung et al., "Depth Prediction from a Single Image with Conditional Adversarial Networks", Institute of Electrical and Electronics Engineers International Conference on Image Processing (ICIP), Abstract, Aug. 31, 2017, 1 pages.

Klein et al., "Model-based Asynchronous Hyperparameter and Neural Architecture Search", Available online at: https://openreview.net/pdf?id=a2rFihIU7i, Mar. 24, 2020, 17 pages.

Kumar et al., "Depthnet: a Recurrent Neural Network Architecture for Monocular Depth Prediction", Proceedings of the Institute of Electrical and Electronics Engineers Conference on Computer Vision and Pattern Recognition Workshops, 2018, pp. 396-404.

Lee et al., "Monocular Depth Estimation Using Relative Depth Maps", Proceedings of the Institute of Electrical and Electronics Engineers /CVF Conference on Computer Vision and Pattern Recognition, 2019, 10 pages.

Li et al., "Depth and Surface Normal Estimation from Monocular Images Using Regression on Deep Features and Hierarchical CRFs", Proceedings of the Institute of Electrical and Electronics Engineers conference on computer vision and pattern recognition, Jun. 2015, pp. 1119-1127.

Lore et al., "Generative Adversarial Networks for Depth Map Estimation from RGB Video", Proceedings of the Institute of Electrical and Electronics Engineers conference on computer vision and pattern recognition workshops, 2018, 9 pages.

Mancini et al., "Toward Domain Independence for Learning-based Monocular Depth Estimation", Institute of Electrical and Electronics Engineers Robotics and Automation Letters 2.3, 2017, pp. 1778-1785.

Mayer et al., "A Large Dataset to Train Convolutional Networks for Disparity, Optical Flow, and Scene Flow Estimation", Institute of Electrical and Electronics Engineers Conference on Computer Vision and Pattern Recognition (CVPR), Dec. 7, 2015, 14 pages.

Ming et al., "Deep Learning for Monocular Depth Estimation: a Review", Neurocomputing, vol. 438, 2021, pp. 14-33.

Ning et al., "All in Tokens: Unifying Output Space of Visual Tasks via Soft Token", arXiv preprint arXiv:2301.02229, 2023, 11 pages.

Poggi et al., "On the Uncertainty of Self-supervised Monocular Depth Estimation", Conference on Computer Vision and Pattern Recognition (CVPR), May 13, 2020, pp. 3227-3237.

Qi et al., "GeoNet: Geometric Neural Network for Joint Depth and Surface Normal Estimation", Institute of Electrical and Electronics Engineers/CVF Conference on Computer Vision and Pattern Recognition, Jun. 1, 2018, 9 pages.

Ranftl et al., "Vision Transformers for Dense Prediction", Proceedings of the Institute of Electrical and Electronics Engineers /CVF International Conference on Computer Vision (ICCV), Mar. 24, 2021, pp. 12179-12188.

Rosa et al., "Sparse-to-Continuous: Enhancing Monocular Depth Estimation using Occupancy Maps", International Conference on Advanced Robotics, Sep. 24, 2018, 8 pages.

Shi et al., "Multimodal AutoML on Structured Tables with Text Fields", International Conference on Machine Learning (ICML) Workshop on Automated Machine Learning, Jul. 14, 2021, pp. 1-15.

Song et al., "SUN RGB-D: a RGB-D Scene Understanding Benchmark Suite", Computer Vision and Pattern Recognition, Jun. 7, 2015, 10 pages.

Tobin et al., "Domain Randomization for Transferring Deep Neural Networks from Simulation to the Real World", Institute of Electrical and Electronics Engineers/RJS International Conference on Intelligent Robots and Systems, Mar. 20, 2017, 8 pages.

* cited by examiner

Second Image Capturing Device 106

First Image Capturing Device 104

Container 100

Conveyor Belt 102

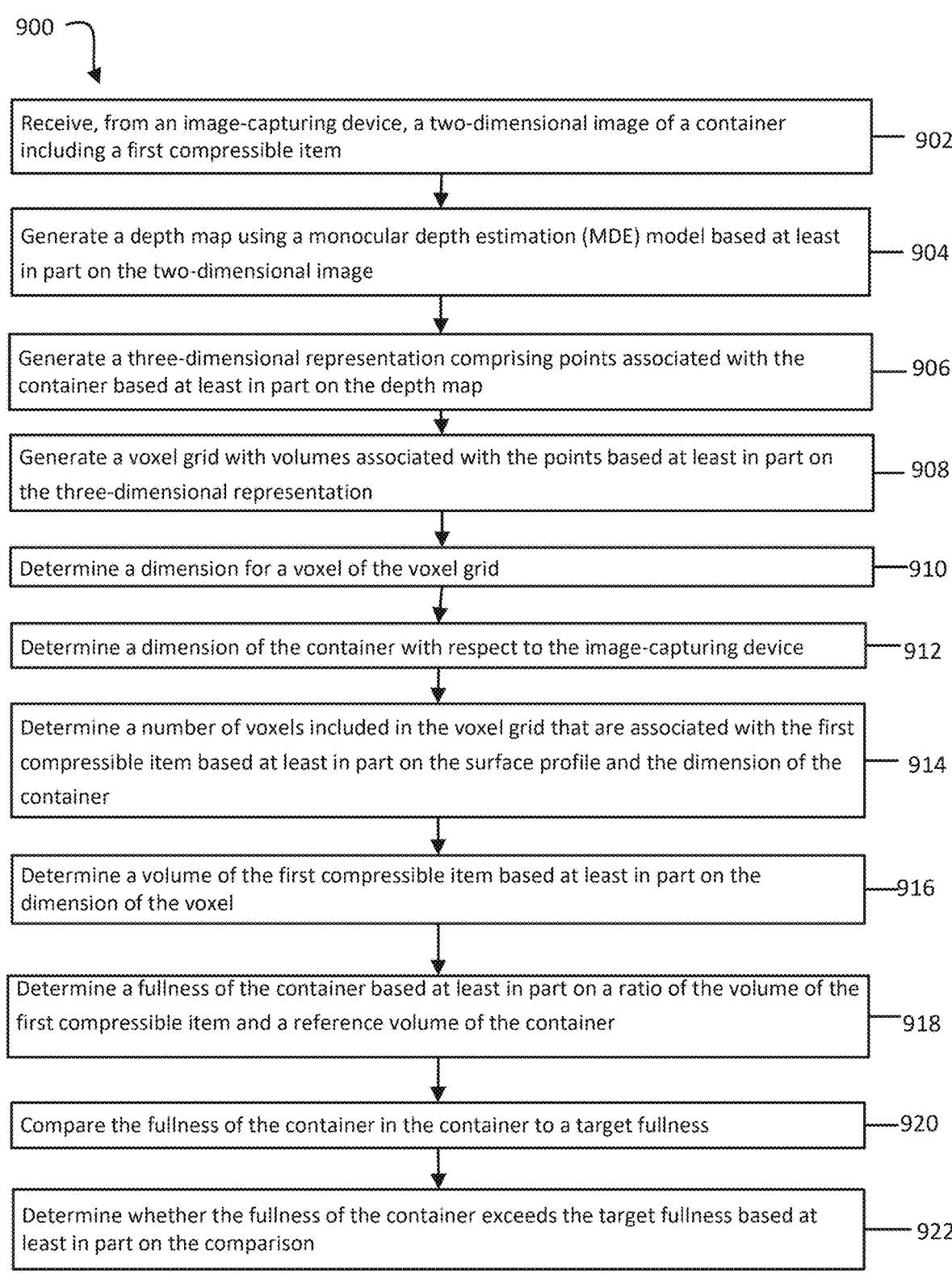

900

Receive, from an image-capturing device, a two-dimensional image of a container including a first compressible item — 902

Generate a depth map using a monocular depth estimation (MDE) model based at least in part on the two-dimensional image — 904

Generate a three-dimensional representation comprising points associated with the container based at least in part on the depth map — 906

Generate a voxel grid with volumes associated with the points based at least in part on the three-dimensional representation — 908

Determine a dimension for a voxel of the voxel grid — 910

Determine a dimension of the container with respect to the image-capturing device — 912

Determine a number of voxels included in the voxel grid that are associated with the first compressible item based at least in part on the surface profile and the dimension of the container — 914

Determine a volume of the first compressible item based at least in part on the dimension of the voxel — 916

Determine a fullness of the container based at least in part on a ratio of the volume of the first compressible item and a reference volume of the container — 918

Compare the fullness of the container in the container to a target fullness — 920

Determine whether the fullness of the container exceeds the target fullness based at least in part on the comparison — 922

FIG. 9

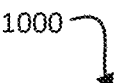

1000

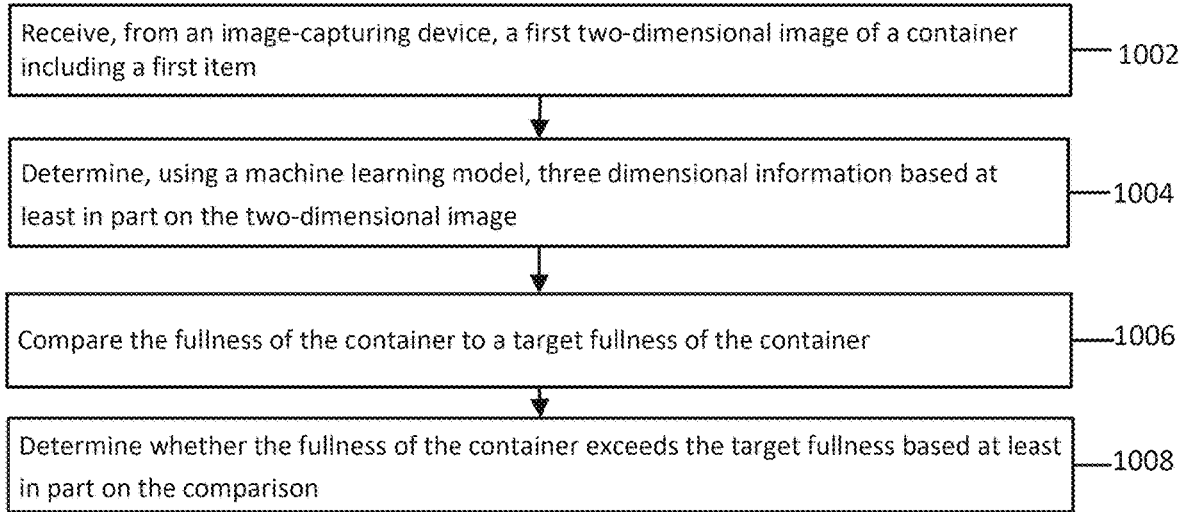

| Receive, from an image-capturing device, a first two-dimensional image of a container including a first item | —1002 |

| Determine, using a machine learning model, three dimensional information based at least in part on the two-dimensional image | —1004 |

| Compare the fullness of the container to a target fullness of the container | —1006 |

| Determine whether the fullness of the container exceeds the target fullness based at least in part on the comparison | —1008 |

FIG. 10

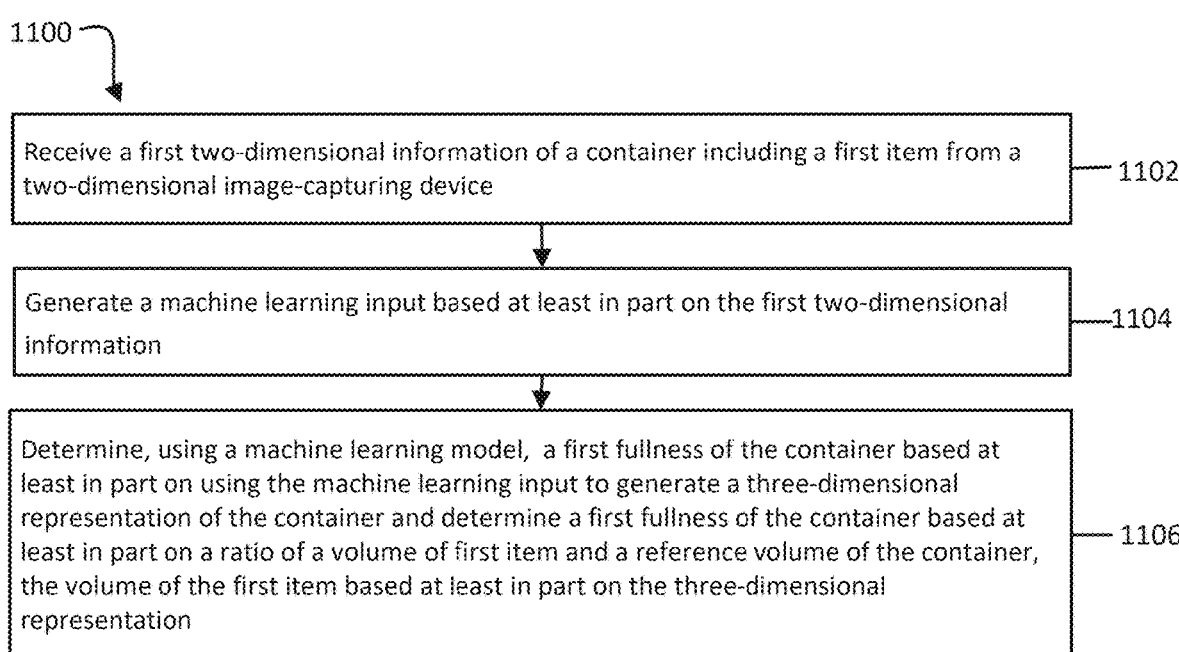

1100

Receive a first two-dimensional information of a container including a first item from a two-dimensional image-capturing device —— 1102

Generate a machine learning input based at least in part on the first two-dimensional information ——1104

Determine, using a machine learning model, a first fullness of the container based at least in part on using the machine learning input to generate a three-dimensional representation of the container and determine a first fullness of the container based at least in part on a ratio of a volume of first item and a reference volume of the container, the volume of the first item based at least in part on the three-dimensional representation —— 1106

FIG. 11

MACHINE LEARNING IMAGE-BASED ESTIMATION OF CONTAINER FULLNESS

BACKGROUND

A commercial enterprise can use a warehouse logistics system to move items from a source location to a target location. In many instances, a container is holding too few items or too many items. If the containers include too few items, the warehouse may be using too many containers. If the containers are holding too many items, the items may fall out of the container during transport. The more efficiently the items are placed into the container, the more efficiently the items can be transported to their destination.

BRIEF DESCRIPTION OF THE DRAWINGS

Various embodiments in accordance with the present disclosure will be described with reference to the drawings, in which:

FIG. 9 illustrates an example process flow for machine learning image-based estimation of container fullness, according to embodiments of the present disclosure.

FIG. 10 illustrates an example process flow for machine learning image-based estimation of container fullness, according to embodiments of the present disclosure.

FIG. 11 illustrates an example process flow for training a machine learning model for image-based estimation of container fullness, according to embodiments of the present disclosure.

DETAILED DESCRIPTION

Figure 1:
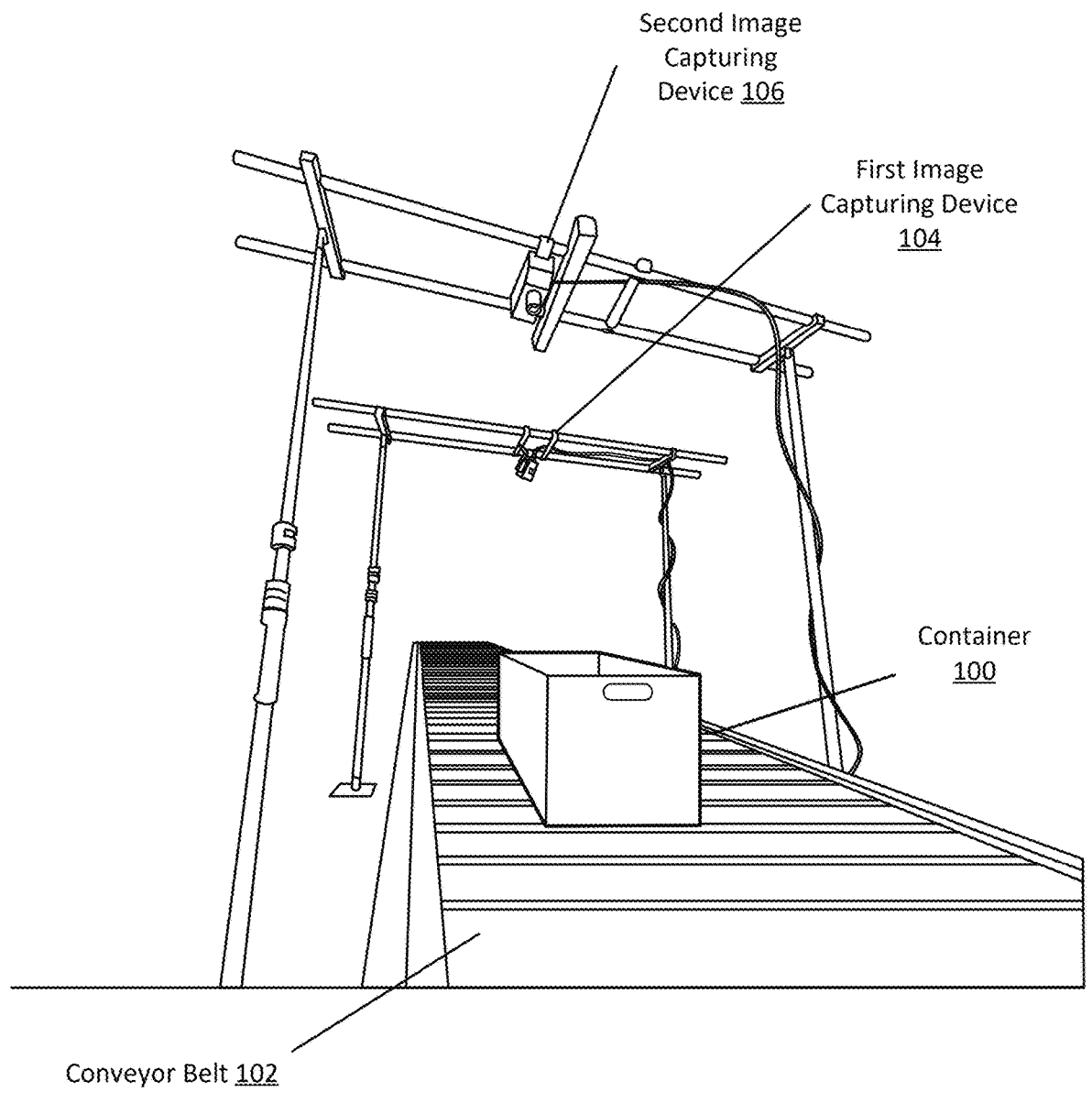
FIG. 1 illustrates an example of a system for machine learning image-based estimation of container fullness, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, machine learning image-based estimation of container fullness. A computing system can receive a two-dimensional image of a container that includes an item and can generate, using a machine learning model, a three-dimensional representation that indicates a fullness of the container. For example, the container can be a container arranged on a table, or on a piece of material handling equipment (e.g., conveyor belt) in a warehouse. An image-capturing device, such as a monocular camera can be arranged above the container. The image-capturing device can capture a two-dimensional image of the container including an item in the container. Unlike an image captured using a stereoscopic device (e.g., a two-camera device), the two-dimensional image may not include depth information. Even though the image may not include depth information, the embodiments herein describe techniques for using machine learning techniques to estimate a three-dimensional fullness of the container.

The computing system can perform various techniques to use the two-dimensional image to generate three-dimensional information from which the volume of the item in the container can be estimated. A first technique can include a monocular depth estimation (MDE)-based approach. The computing system can receive a two-dimensional image of the item and the container. The computing system can further use an MDE model to generate a depth map based on the two-dimensional image. Based on the depth map, the computing system can use a machine learning model to generate a three-dimensional representation (e.g., a point cloud) of the container and the item. Based on the three-dimensional representation, the computing system can estimate the volume of the item. The volume of the container while empty can be a known value, and the computing system can use the volume of the item and the volume of the container to determine a fullness of the container. Based on the fullness of the container, the computing system can also determine the amount of usable volume in the container to add an additional item, keep the number of items the same, or remove an item.

Another technique can include an end-to-end technique. This approach uses a machine learning model including a transformer architecture connected to a set of fully connected layers. Rather than output a depth map, the machine learning model can output a fullness value that indicates whether the container is at a target fullness. Therefore, the end-to-end approach can result in the fullness value without an explicit depth determination or volume calculation.

To illustrate, consider an example, of a computing system that receives a two-dimensional image of a container holding one or more items. The container can be moving along a conveyor belt in a warehouse and have been filled with the one or more items. For the warehouse to be operating efficiently the container should be filled to a target fullness. The target fullness may not be 100%, and for various reasons be closer to 65%. It is possible that when the container was initially filled with the one or more items, the container was not filled to its target fullness. For example, the container may be 50% filled, and in which case, the container still has 15% of usable volume for one or more additional items. Or the container may be overfilled and be, for example, 80% filled. The computing system can process the two-dimensional image to determine the fullness of the container. For example, the computing system can use the above-referenced MDE-based approach or end-to-end approach to determine whether the container is at target fullness. If the computing system determines that the container is filled to its target fullness, the container can continue to move along the conveyor belt to its destination. If, however, the computing system determines that the container is not filled to its optimal capacity, the computing system can transmit a message to another warehouse computing system. The other warehouse computing system can cause the container to be filled with one or more additional items or have one or more items removed.

Embodiments of the present disclosure provide several technical advantages over conventional methods. Some conventional methods for determining the volume rely on three-dimensional sensors (three-dimensional stereo sensors) to estimate the fullness of a container. However, three-dimensional are costly to acquire, maintain, and require more complex software than two-dimensional sensors. The herein-described techniques can be performed using a two-dimensional sensor, which can be cheaper, easier to maintain, and be supported by less complex software. Other conventional methods for determining volume rely on pre-determined volumes of objects. A conventional system can use image recognition to identify different objects, the system may then determine the volume by mapping the identified object to a predetermined volume. For example, the computing system can receive an image and perform image analysis to determine the image is of a shoebox. The computing system can then map a shoebox to a pre-determined volume of 347 cubic centimeters. However, this approach only applies to items that have static sizes, such as boxes. This approach does not consider compressible items, such as a comforter, whose volume may change if another object is stacked on top of the comforter. This approach also does not consider cavities that may form if two items are stacked on top of each other in a manner that a cavity is formed between the items.

FIG. 1 illustrates an example of a system for machine learning image-based estimation of container fullness, according to embodiments of the present disclosure. A container 100 can be arranged on a conveyor belt 102. The container 100 can include one or more items that occupy some portion of the container's volume. In other words, the container 100 can include a combination of occupied volume and usable volume (e.g., empty space), where the total volume in the container is the sum of the occupied volume and the usable volume. A first image-capturing device 104 can arranged above the conveyor belt 102 to capture an image of the container 100 and any items held by the container 100. The first image-capturing device 104 can either capture a two-dimensional image of the container 100 including any items or a video of the container 100 and items as they pass by along the conveyor belt 102. The first image-capturing device 104 can transmit the image or video to a computing system.

The computing system can use the above-referenced MDE-based approach or end-to-end approach to determine the amount of occupied volume and usable volume in the container 100. As indicated above, if the computing system uses the MDE-based approach, the computing system can receive the two-dimensional image of the container 100 captured by the first image-capturing device 104. The computing system can further use an MDE model to generate a depth map for items in the container 100. Based on the depth map, the computing system can generate a three-dimensional representation (e.g., a point cloud) of the container 100 and any items included in the container 100. The computing system can further determine the volume of the occupied volume in the container 100, based on the three-dimensional representation. Based on the occupied volume and the total volume in the container 100, the computing system can determine the fullness of the container. The computing system can then compare the fullness to a target fullness to determine if any more items should be placed in the container 100, number of items remain the same, or any items should be removed.

On the other hand, if the computing system uses the end-to-end approach, the computing system can receive a two-dimensional image of the container 100 captured by the first image-capturing device 104. The computing system can use an MDE model connected to a set of fully connected layers to determine, without explicitly estimating depth and volume calculation, whether the container 100 is at the target fullness or not. The computing system can then compare the fullness to a target fullness to determine if any more items should be placed in the container 100, number of items should stay the same, or any items should be removed.

A second image-capturing device 106 is illustrated in FIG. 1 for the purposes of describing the training of the MDE model. The second image-capturing device 106 is a three-dimensional sensor used to generate ground truth data to test the MDE model, and will be discussed below in relation to training techniques. In a real-world scenario, the computing system can be expected to use a trained MDE model to help determine the fullness of the container 100 without the presence of the second image-capturing device 106.

Figure 2:
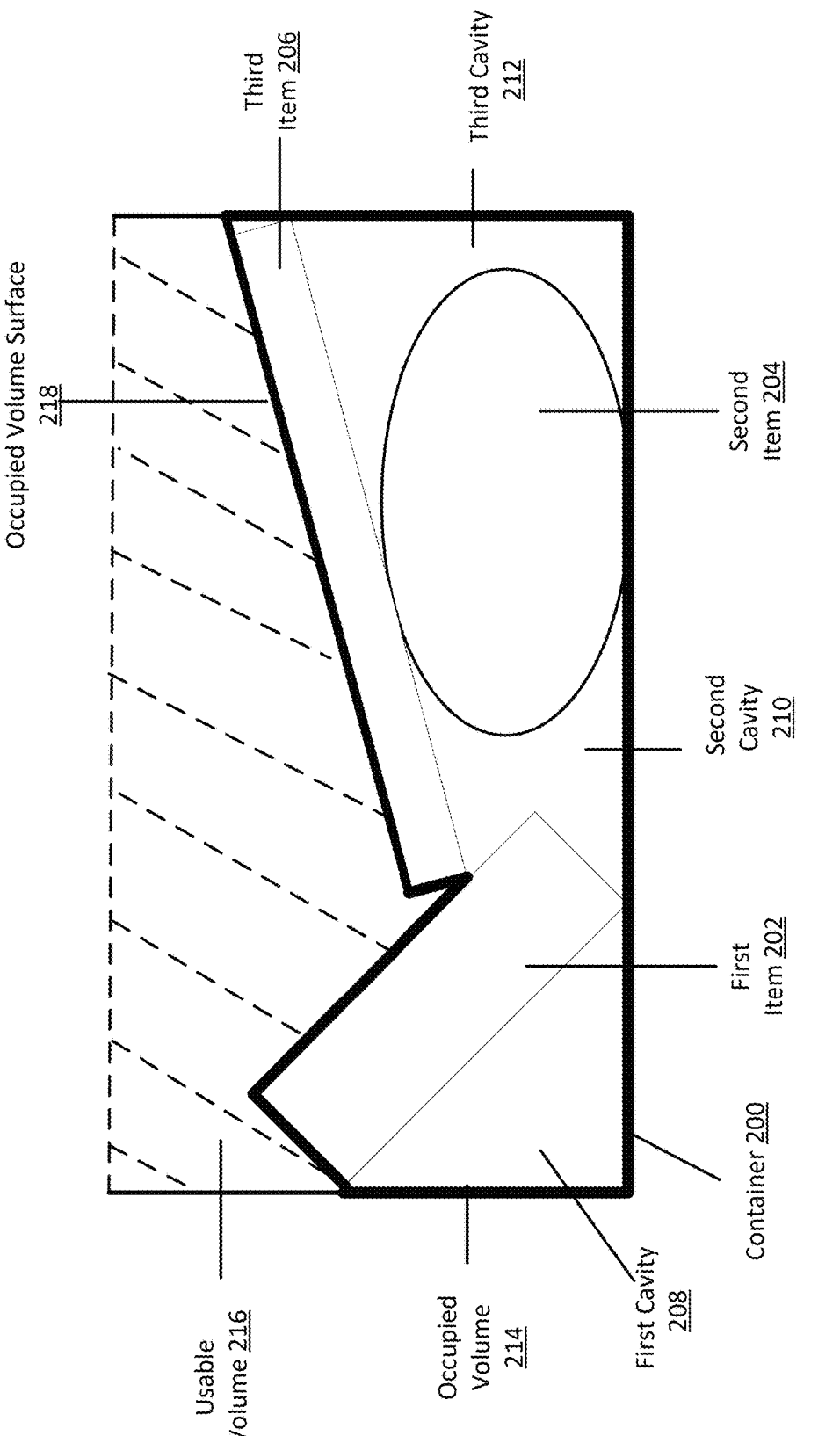
FIG. 2 illustrates an example container including items, according to embodiments of the present disclosure.

FIG. 2 is an illustration of an example container including items, according to embodiments of the present disclosure. As illustrated, a container (e.g., container 100) can include a first item 202, a second item 204, and a third item 206. The container 200 can include a base, a lateral surface extending away from the base, and an open top to allow items to be placed in the container 200. The lateral surface can be generally rectangular, square or arcuate. The container can have various dimensions. For example, one container has a greater height than another container. In another example, one container has a greater width than another container. The items can be various items that include different shapes, sizes, and properties. For example, it can be seen in FIG. 2 that both the first item 202 and the third item 206 have a different shape (e.g., rectangular) than the shape (e.g., oval) of the second item 204. It can further be seen, that although the first item 202 and the third item 206 have the same general shape, the items have different dimensions. As indicated above, the items can also have different properties. The first item 202 and the third item 206 appear to be rigid, whereas the second item 204 appears to be compressible. In other words, the volume that the second item 204 occupies in the container 200 may be dependent on any forces applied to the second item 204 by the other items or the container 200.

It can further be seen in FIG. 2, the first item 202, the second item 204, and the third item 206 are not in the container 200 in optimal positions for space saving. The first item 202 is arranged diagonally against a side wall and the base of the container 200. The diagonal arrangement has created a first cavity 208 between the first item 202 and the container 200. Additionally, a second cavity 210 has formed between the first item, 202, the second item 204, the third item 206 and the container. A third cavity 212 is formed between the second item 204, the third item 206, and the container 200. The occupied volume 214 in the container includes the volume of the first item 202, the second item 204, the third item 206 and the volume of the first cavity 208, the second cavity 210, and the third cavity 212. For illustration purposes, the occupied volume 214 has been delineated by the bold line.

The usable volume 216 is the volume of empty space above the occupied volume 214. It should be noted that the usable volume 216 does not necessarily include the cavities, as a fourth item placed in the container 200 would not be able to reach a cavity. Rather, the usable volume 216 extends from the occupied volume surface 218 to the top of the container 200. For illustration purposes, the usable volume 216 is illustrated using the dashed diagonal lines. The sum of the occupied volume 214 and the usable volume 216 can equal the total volume of the container 200, if the container 200 was empty. The occupied volume ($V_{occupied}$) can be expressed as:

$$V_{occupied} = \sum Vitem_i + \sum Vcavity_j, \tag{1}$$

where V is the volume, "item" is an item in the container 200, and "cavity" is a cavity formed by an item and the container 200.

The fullness of the container 200 can be the occupied volume divided by the total volume ($V_{container}$) of the container 200, where the $V_{container}$ is the volume, if the container 200 was empty. $V_{container}$ can be a known quantity, for example, $V_{container}$ can be provided by the manufacturer of the container 200, or measured by one using the container 200. $V_{container}$ can be expressed as:

$$V_{container} = V_{occupied} + V_{usable}. \tag{2}$$

Furthermore, the fullness can be expressed as:

$$Fullness = \frac{V_{occupied}}{V_{container}}. \tag{3}$$

As indicated above, the target fullness is not equal to $V_{container}$, rather the target fullness is some percentage of $V_{container}$ that is less than 100% (e.g., 65%).

Figure 3:
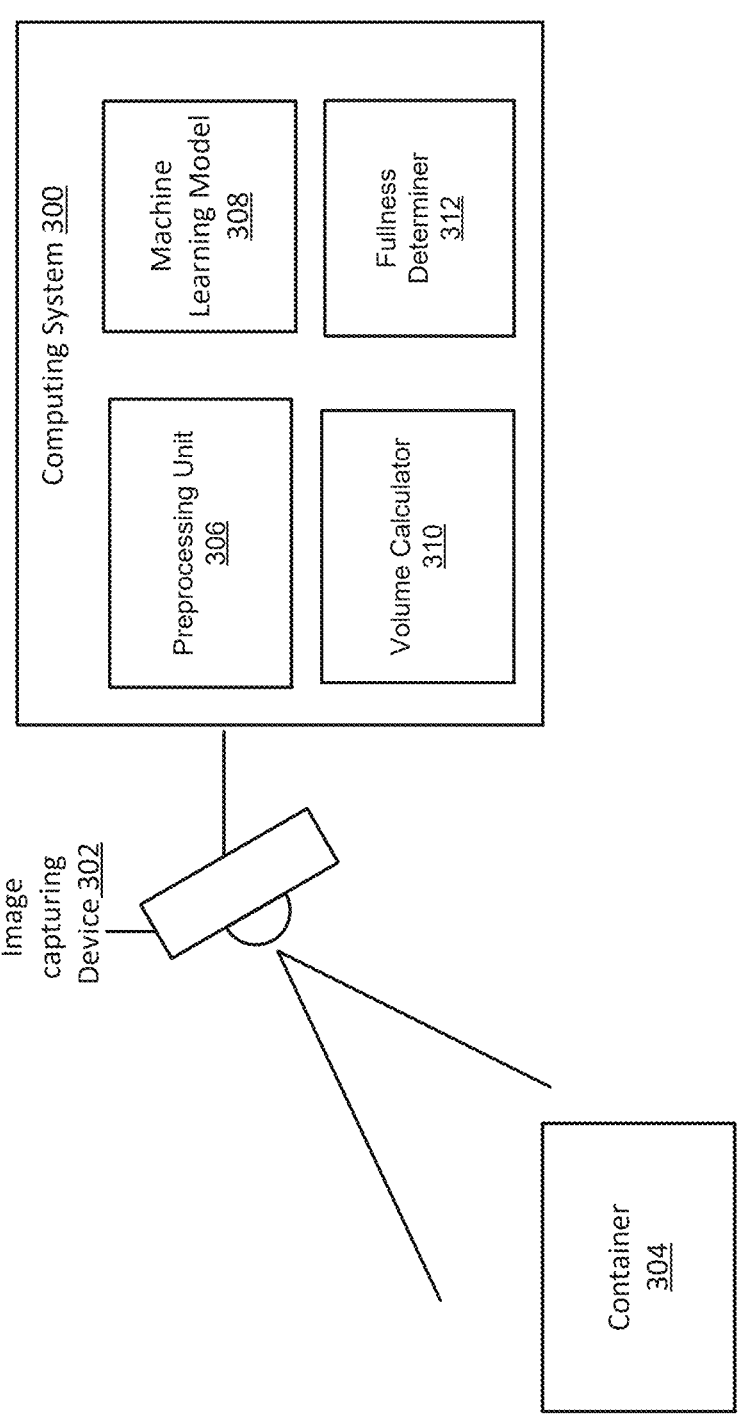
FIG. 3 illustrates a system for image-based estimation of container fullness, according to embodiments of the present disclosure.

FIG. 3 illustrates a system for image-based estimation of container fullness, according to embodiments of the present disclosure. The operations and outputs are described with respect to FIG. 3 are described in more detail with respect to FIGS. 4-6. As illustrated, a computing system 300 can be in operable communication with an image-capturing device (e.g., first image-capturing device 104). The image-capturing device 302 can be arranged such that a container 304 (e.g., container 100) is in its field of view. The image-capturing device 302 can capture a two-dimensional image of the container 304 and transmit the image to the computing system 300. The image can be received by a preprocessing unit 306 that can preprocess the image. For example, the preprocessing unit 306 can crop the image to identify the ROI, and filter the cropped image to remove any noise. The preprocessing unit 306 can transmit the filtered image to a machine learning model 308. The machine learning model 308 can be configured to perform different tasks, based on a depth estimation approach. For example, if the approach is an MDE-based approach the machine learning model 308 can be tasked with outputting a depth map. If, however, the approach is an end-to-end approach, the machine learning model 308 can be tasked with outputting a fullness value.

If the approach is an MDE-based approach, the computing system 300 can cause the depth map to be transmitted to a volume calculator 310. The volume calculator 310 can generate a three-dimensional representation using the depth map and determine a volume of the occupied space of the container 304. The computing system 300 can further divide the occupied space volume from the total volume of the container and determine the fullness value.

If the approach is an end-to-end approach the machine learning model can output a fullness value. Furthermore, if the computing system 300 is configured to perform the end-to-end approach, there is no volume calculator 310. In either the MDE-based approach or the end-to-end approach, the computing system 300 can cause the fullness value to be transmitted to the fullness determiner 312. The fullness determiner 312 can compare the fullness value to one or more target values. The fullness determiner 312 can further determine whether the container has reached a target fullness, based on the comparison.

Figure 4:
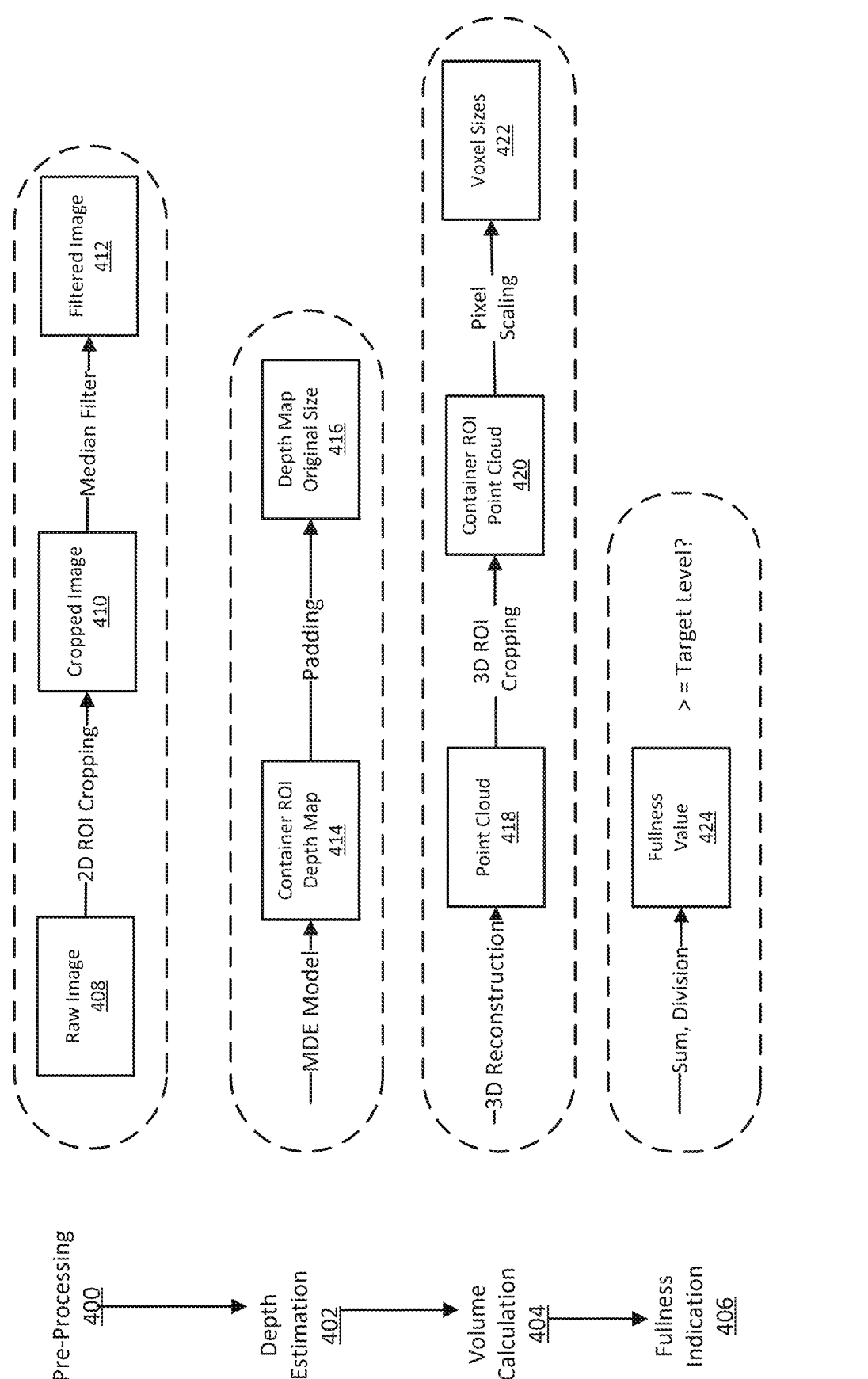
FIG. 4 illustrates of an example monocular depth estimation (MDE)-based approach, according to embodiments of the present disclosure.

FIG. 4 illustrates an example MDE-based approach, according to embodiments of the present disclosure. As illustrated, the MDE-based approach can include four stages, pre-processing stage 400, depth estimation stage 402, volume calculation stage 404, and fullness indication stage 406. A computing system can receive a raw image 408. For example, the computing system can receive a raw image 408 captured by an image-capturing device (e.g., the first image-capturing device 104), where a raw image is an image that has received minimal processing. The raw image 408 can be a two-dimensional RBG image or grayscale image. The raw image 408 can be cropped to isolate the region of interest (ROI). For example, if the raw image 408 included the container and items on a conveyor belt, the computing system can crop the raw image 408 to remove as much of the conveyor belt as possible. The cropped image 410 can be processed, for example, using a median filtering technique, to remove any noise and generate a filtered image 412.

For the depth estimation stage 402, the computing system can use the filtered image 412 as an input for a MDE model. The MDE model can be implemented by a neural network and have a transformer architecture. The MDE model can process the filtered image 412 and generate an intermediate depth map 414. The intermediate depth map 414 can include information about a distance of the surface of points on an object(s) from a reference point. In this case, the points of the objects can be depicted by the pixels of the filtered image 412 describing the surface of the container and items, and the reference point can be the lens of the first image-capturing device. In some instances, the MDE model processing causes a spatial reduction of the filtered image 412. Therefore, the MDE model can perform a padding process to restore the size of intermediate depth map 414 to the size of the filtered image 412, where padding is a process of adding pixels to the border of the intermediate depth map 414.

The computing system can use the depth map 416 for the volume calculation stage 404. The computing system can use the depth map 416 to generate a three-dimensional representation of the container and items. For example, the computing system can use the depth values to convert from a two-dimensional coordinate system to a point cloud 418 having a three-dimensional coordinate system. The point cloud 418 can include a set of points, in which each point has an x, y, and z coordinate. The computing system can further crop the point cloud 418 to remove points that are not associated with the ROI (e.g., container or items) to generate a cropped point cloud 420. The computing system can then engage in a pixel scaling operation, in which an algorithm is used to multiply the integer values of the depth map by a scalar to convert them into real-world units (e.g., millimeters, centimeters). The computing system can further convert the point cloud to a voxel-based representation, where a voxel is a representation of a unit in three-dimensional space similar to a pixel in two-dimensional space. Generally, each voxel has the same geometric shape, such as a cuboid, and has a uniform volume. It should be appreciated that the occupied volume (e.g., occupied volume 214) can be represented by a set of voxels.

For example, the computing system can determine the three-dimensional coordinates, based on the two-dimensional coordinates and the intrinsic parameters of the first image-capturing device as follows:

$$\begin{bmatrix} x \\ y \\ z \end{bmatrix} / z = \begin{bmatrix} f_x & 0 & c_x \\ 0 & f_y & c_y \\ 0 & 0 & 1 \end{bmatrix} \begin{bmatrix} u \\ v \\ 1 \end{bmatrix}, \quad (4)$$

where x, y, and z represent coordinates in three-dimensional space, u and v represent two-dimensional coordinates, and $f_x$, $f_y$, $c_x$, and $c_y$ represent the first image-capturing device's intrinsic parameters. A side length (l) of a pixel can be represented as follows:

$$l_u = z/f_x \quad (5)$$

The volume of a voxel cuboid, $V_{cuboid}$, can be expressed as follows:

$$V_{cuboid} = |z - z_0| \cdot l_u \cdot l_v \quad (6)$$

The occupied volume, $V_{occupied}$, can be expressed as follows:

$$V_{occupied} = \sum_{i \in P} V_{cuboid} \quad (7)$$

The computing system can engage in a fullness indication stage 406. The computing system can determine the occupied volume of the container, based on the individual volumes of the voxels. For example, the computing system can determine a sum of the volume of all of the voxels that comprise the occupied volume. The computing system can then divide the occupied volume by the container volume to determine the fullness value 424. The fullness value can be expressed as described in equation 3 above.

The computing system can then compare the fullness value 424 to a target fullness. Based on the comparison, the computing system can determine whether the container is below, at, or above a target fullness. If the container is below the target fullness, the computing system can transmit a message to another computing system to add one or more items to the container. If the container is at the target fullness, the computing system can input an entry into a log that that container is at the target fullness. If the container is above a target fullness, the computing system can transmit a message to another computing system to remove one or more items from the container.

Figure 5:
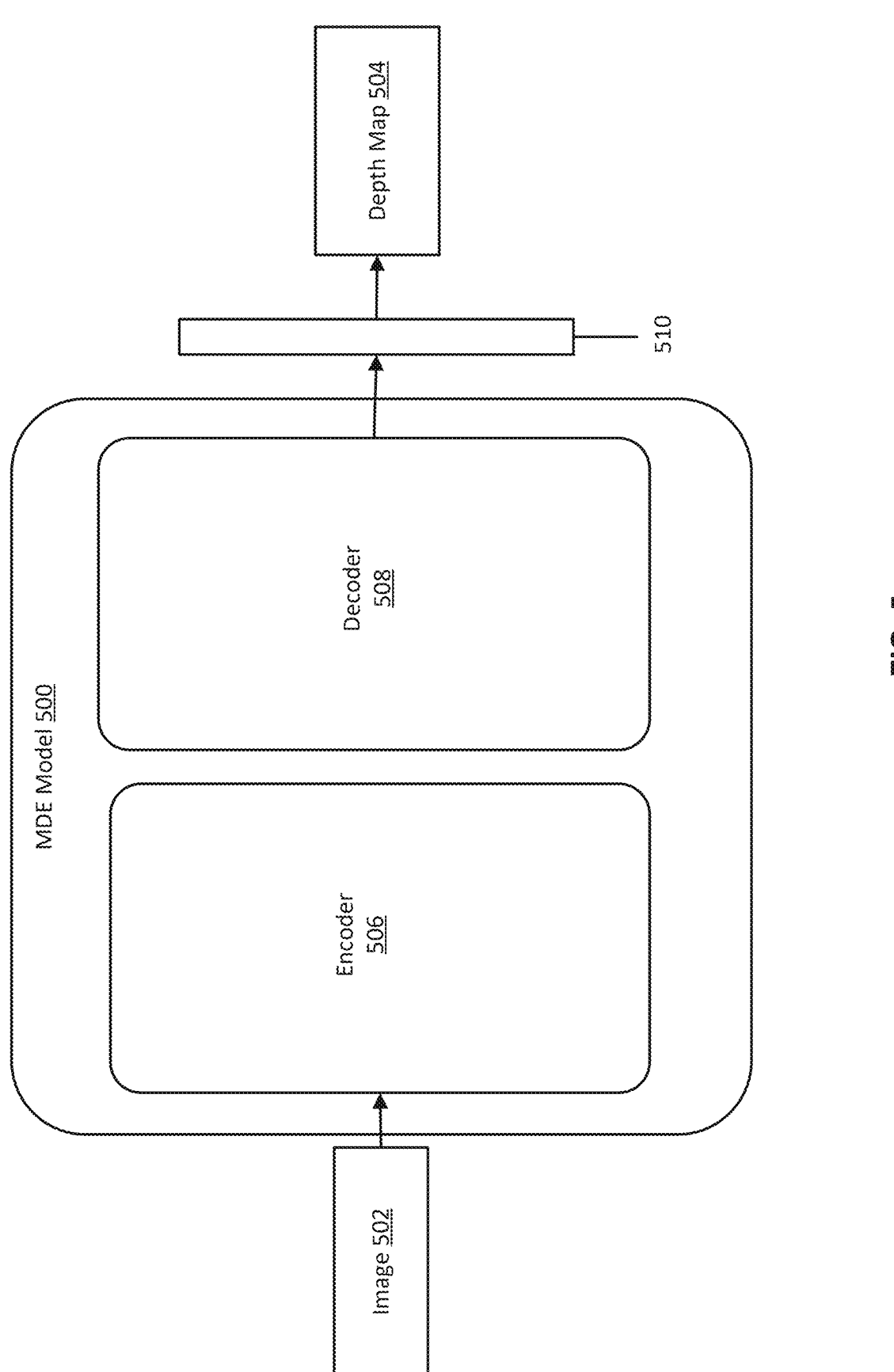
FIG. 5 illustrates an example MDE model, according to embodiments of the present disclosure.

FIG. 5 illustrates an example MDE model, according to embodiments of the present disclosure. The MDE model 500 can be a machine learning model that is configured to receive an image 502 (e.g., the filtered image 412) and output a depth map 504 ((e.g., the intermediate depth map 414). The illustrated configuration of the MDE model 500, the image 502, and the depth map 504 can be used as part of the MDE-based approach described above. For example, the MDE model 500 can be configured for the depth estimation state 402 described in FIG. 4. In some instances, the MDE model can use a transformer-based architecture (e.g., a vision transformer (ViT)-based architecture) that includes an encoder 506 and a decoder 508. The encoder 506 can include a set of convolutional layers that learn depth features. For example, the encoder 506 can use a virtual geometry group (VGG)-based architecture, a residual neural network (ResNet)-based architecture, or a DenseNet-based architecture to extract depth features from the image 502. As the encoder 506 processes the image to extract the depth features, the encoder can engage in a downsampling technique, in which the encoder progressively reduces the spatial dimensions of the image 502 to reduce computational complexity and better identify relevant depth features.

The decoder 508 can receive the depth features and use a regression technique to generate the depth map via an output layer 510. As the encoder 506 used a downsampling technique, the decoder 508 can use an upsampling technique to progressively increase the spatial dimensions of the image 502. The encoder can use upsampling to reclaim the spatial dimensions and details that may have been lost during the downsampling technique. Once, the MDE model 500 has generated the depth map 504, the depth map 504 can be used to determine the occupied volume of the container as described with respect to FIG. 4.

Figure 6:
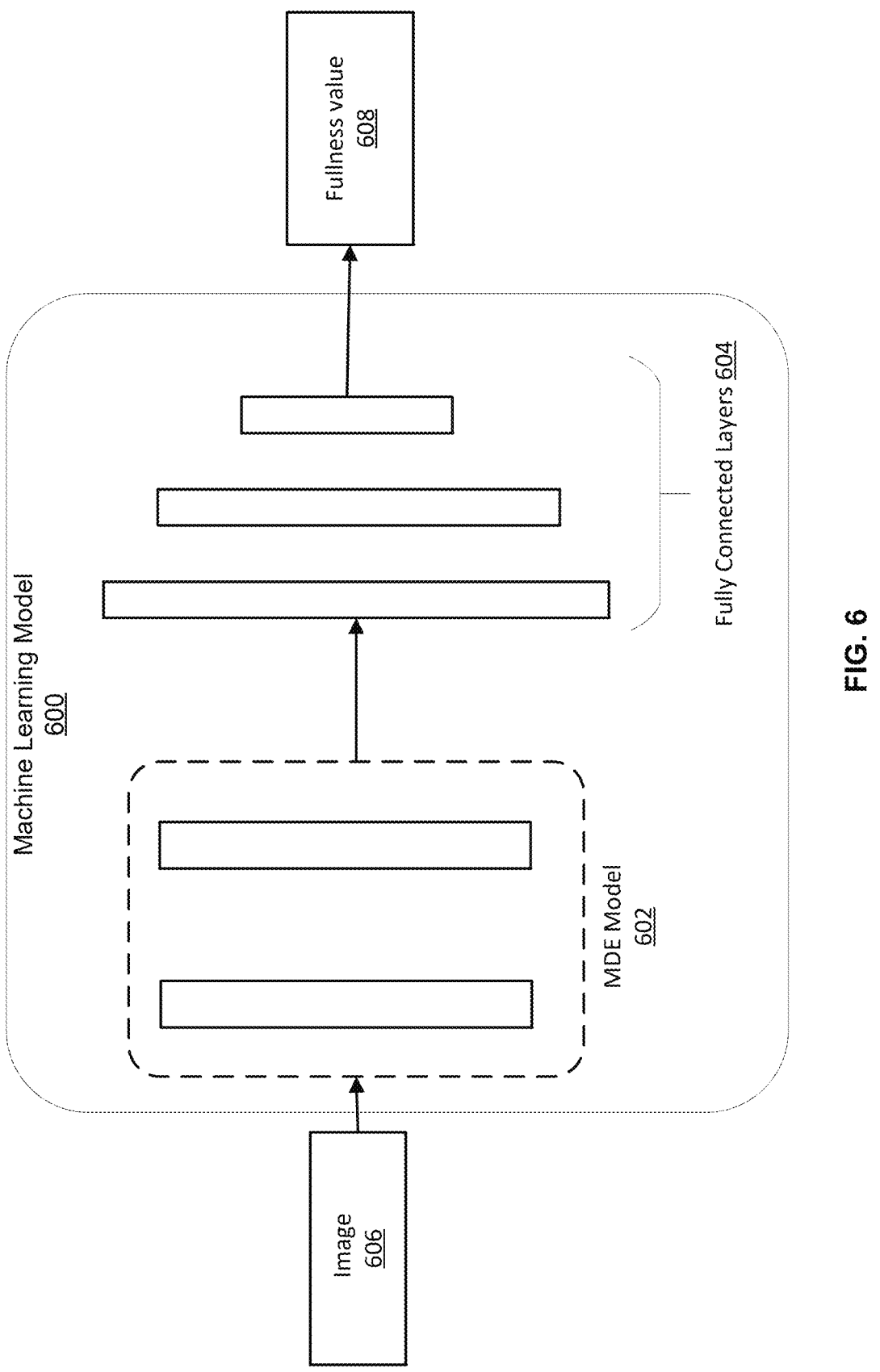
FIG. 6 illustrates an example end-to-end model, according to embodiments of the present disclosure.

FIG. 6 illustrates an example machine learning model, according to embodiments of the present disclosure. The machine learning model 600 can be an MDE model 602 (e.g., MDE model 500) connected to a set of fully connected layers 604. The machine learning model 600 can be configured to receive an image 606 (e.g., the filtered image 412) and output, via the fully connected layers 604 a fullness value 608. The illustrated configuration of the machine learning model 600, the image 606, and the fullness value 608 can be used as part of the end-to-end approach described above.

The MDE model 602 can be the same as the MDE model 500 of FIG. 5. However rather than be connected to an output layer that outputs a depth map, the MDE model 602 can be connected to a set of fully connected layers 604. The set of fully connected layers 604 can be layers, in which the inputs from one layer are connected to each activation unit of a next layer. The computing system can use the set of fully connected layers 604 to perform depth feature extraction from the output of the MDE model 602. As each neuron in the fully connected layers is connected to each neuron in the next layer, the set of fully connected layers 604 can identify relationships between the depth features to enable determining the fullness value 608. The computing system can use the set of fully connected layers 604 to perform non-linear transformations to weighted sum calculations performed at each neuron. The computing system can further use the set of fully connected layers 604 to map the image 606 to a fullness value 608 based on the non-linear transformations. In other words, the set of fully connected layers 604 enables the determination of the fullness value 608 without explicitly estimating depth and can calculate the occupied volume.

As described, the end-to-end process results in the fullness value 608. Therefore, the computing system can then compare the fullness value 608 to a target fullness. Based on the comparison, the computing system can determine whether the container is below, at, or above a target fullness. If the container is below the target fullness, the computing system can transmit a message to another computing system to add one or more items to the container. If the container is at the target fullness, the computing system can input an entry into a log that that container is at the target fullness. If the container is above a target fullness, the computing system can transmit a message to another computing system to remove one or more items from the container.

It should be appreciated that in other embodiments, the end-to-end approach can be implemented using a machine learning model having transformer architecture that is distinct from the architecture of the MDE model 602. The transformer architecture can include an encoder and output a fullness value 608 without explicitly estimating depth or calculating the occupied volume. Similar to as described above, the computing system can then compare the fullness value 608 to a target fullness. Based on the comparison, the computing system can determine whether the container is below, at, or above a target fullness. If the container is below the target fullness, the computing system can transmit a message to another computing system to add one or more items to the container. If the container is at the target fullness, the computing system can input an entry into a log that that container is at the target fullness. If the container is above a target fullness, the computing system can transmit a message to another computing system to remove one or more items from the container.

Figure 7:
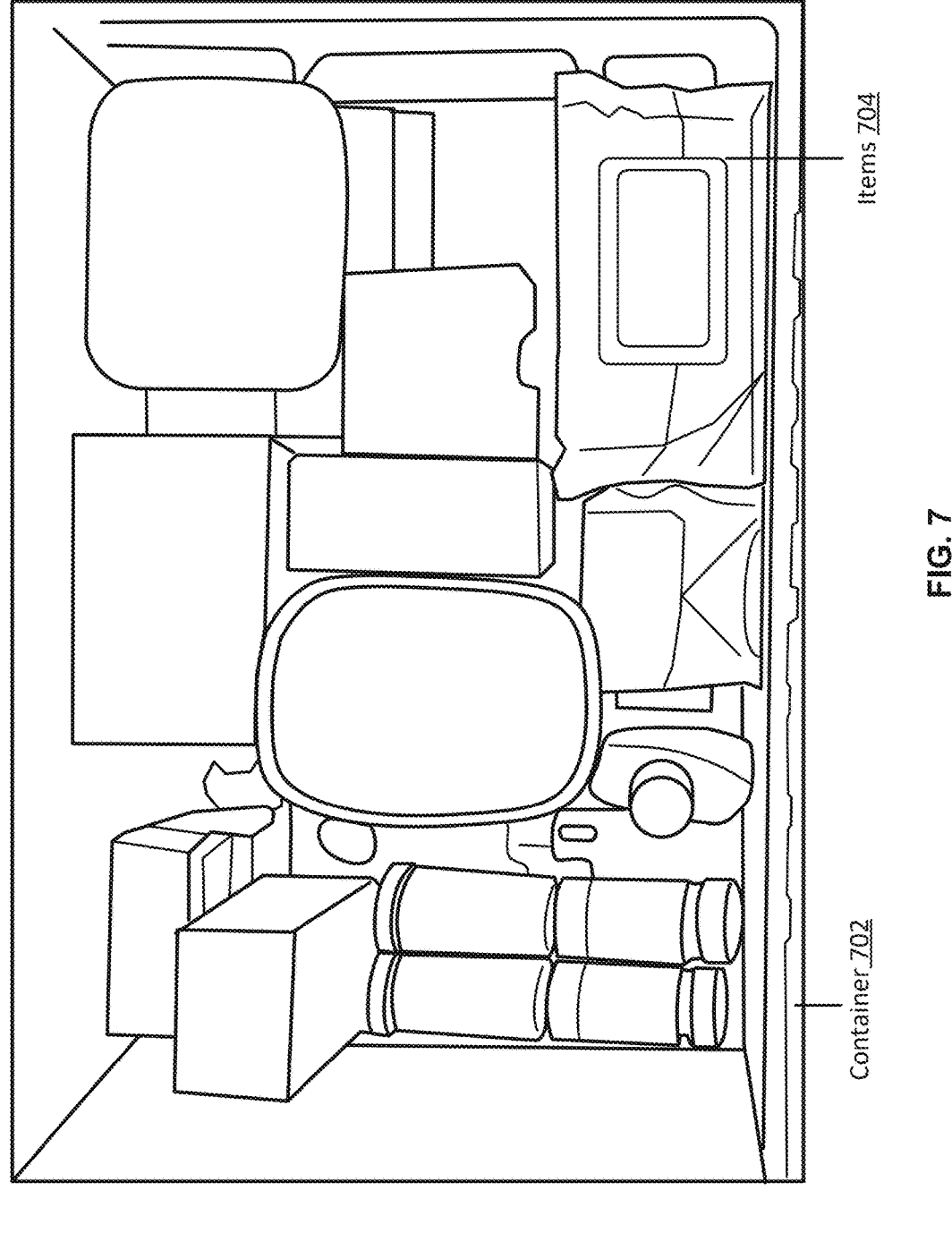
FIG. 7 illustrates an example image of a container, according to embodiments of the present disclosure.
Figure 8:
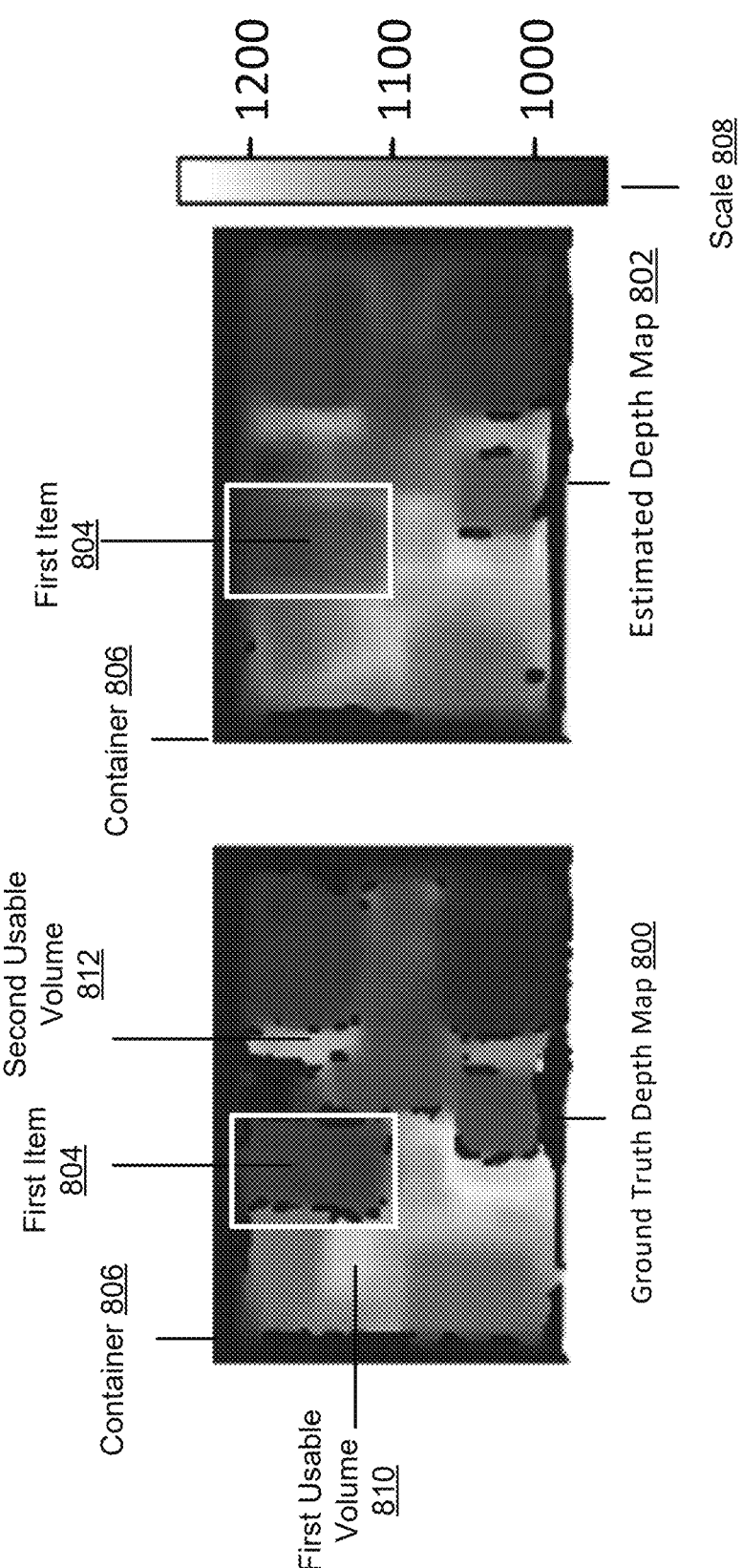
FIG. 8 illustrates a ground truth depth map and an estimated depth map, according to embodiments of the present disclosure.

FIG. 1, FIG. 7, and FIG. 8 are provided to help illustrate a training process for image-based estimation of container fullness. FIG. 7 illustrates an example image 700 of a container, according to embodiments of the present disclosure. The image 700 can be a two-dimensional image of a container 702 that include different items 704. The image 700 can be captured by an image-capturing device (e.g., the first image-capturing device 104). It should be appreciated that as illustrated, the image 700 appears to be captured by an image-capturing device arranged directly above the container 702. During a training phase, the image-capturing device and the container can be arranged in a variety of positions so that the images (e.g., training instances) do not always provide an optimal view of the container 702 or the items 704 included therein. It should be appreciated that the image 700 does not display any cavities (e.g., the first cavity 208, the second cavity 210, the third cavity 212) formed by the items 704. Rather the image depicts the occupied volume surface (e.g., the occupied volume surface 218).

A second image-capturing device (e.g., second image-capturing device 106) can also be arranged to capture an image of the container 702. The second image-capturing device 106 can be arranged at a more optimal position than the first image-capturing device 104. Referring back to FIG. 1, the second image-capturing device 106 can be arranged directly above the conveyor belt 102, whereas the first image-capturing device 104 can be arranged off to the side of the conveyor belt 102. Furthermore, during the training phase, the first image-capturing device can be arranged at various positions to capture images of the container from multiple viewpoints about the container 702. The purpose of arranging the first image-capturing device at a sub-optimal arrangement is to provide the MDE model with a sub-optimal training instance image during the training phase. For in a real-world scenario, there may not be an opportunity to optimally arrange the first image-capturing device. The second image-capturing device 106 can capture three-dimensional images to be used as ground truth data to validate the MDE model. The second image-capturing device can be a three-dimensional camera. In other instances, the ground truth data can be collected by another sensor, such as a light detection and ranging (LiDAR) sensor, or other appropriate sensor that can provide depth information.

During a training phase for the MDE-based approach, the first image-capturing device can be used to capture a first image of the container 702 and the second image-capturing device can be used to capture a second image of the container 702. The first image can be used as a training instance for the MDE model. The MDE model can receive the first image and output an estimated depth map. The process for generating the estimated depth map can be similar to the pre-processing stage 400 and the depth estimation stage 402 of FIG. 4. The second image (e.g., ground truth image) can be used to generate a ground truth depth map. For example, the second image-capturing device can include a time of flight camera and the ground truth depth map can be generated based on determining a delay between an emission of light from the camera and a receiving a reflected signal. In other instances, the ground truth depth map can be generated by inputting the first image into a trained MDE model. In the event that a trained MDE model is used to generate the ground truth depth map, the trained MDE model can also follow steps similar to the pre-processing stage 400 and the depth estimation stage 402 of FIG. 4.

FIG. 8 illustrates a ground truth depth map 800 and an estimated depth map 802, according to embodiments of the present disclosure. Each of the ground truth depth map 800 and estimated depth map provide depth information for the same set of items in the same container. As seen in FIG. 8 a first item 804 in the container 806 is seen in both depth maps. A white border has been provided around the first item 804 for illustration purposes. A scale 808 is illustrated to indicate the depth of the container or the items. For example, the scale 808 indicates that the lighter the pixel on either depth map, the greater the depth (e.g., greater the distance from the image-capturing device), and the darker the pixel the lesser the depth. The first item 804 is described with darker pixels than portions of the surrounding area (e.g., the first usable volume 810 and second usable volume 812), indicating that the first item 804 is closer to the top of the container 806 than the surrounding portions.

The estimated depth map 802 can be validated against the ground truth depth map 800 using a loss function. The loss function can be used to measure the difference between the ground truth depth map 800 and the estimated depth map 802 and consequently the accuracy of the MDE model being trained. After each training iteration, the weights of the MDE model being trained can be adjusted until the accuracy of the MDE model reaches a target accuracy.

Training the MDE model with the fully connected layers for the end-to-end process can be a different process than training the MDE model for the MDE-based process. The first image-capturing device can capture a multiple images of the container from multiple viewpoints and the second image-capturing device can capture ground truth information. The MDE model with the fully connected layers to be trained can receive an image of the container and be tasked with outputting the fullness value (e.g., fullness value 606). Therefore, rather than have the computing system perform depth estimation and volume calculation, the MDE model with the fully connected layers can determine the fullness value based on feature extraction of the image. Furthermore, receiving multiple training images from multiple viewpoints assists the MDE model with the fully connected layers to identify the features and the relationships between the features.

The ground truth fullness value can be determined based on a manual inspection of the container and items. A ground truth fullness value can be generated using data collected from a sensor device (e.g., the second image capturing device 106). The fullness value can be validated against the ground truth fullness value using a loss function. The loss function can be used to measure the difference between the fullness value and the ground truth fullness value, and consequently the accuracy of the MDE model with fully connected layers being trained. After each training iteration, the weights of the MDE model with fully connected layers being trained can be adjusted until the accuracy reaches a target accuracy.

The computing system can also determine the number of usable volumes described in a depth map. Referring back to FIG. 2, the usable volume 216 is a contiguous volume, in that any additional items can be placed in a single usable volume. However, as seen in FIG. 8, the depth of the some of the items is low enough that the usable volume is split into the first usable volume 810 and the second usable volume 812. Therefore, the computing system can use computer vision techniques to determine whether a pixel associated with a lowest depth (or within a threshold range of the lowest depth) is a contiguous with each other pixel associated with the same depth, or split into multiple portions on the depth map. For example, once the computing system identifies a pixel associated with a lowest depth (or within a threshold range of the lowest depth) on the depth map, the computing system can determine whether the depth map can be traversed to reach each other pixel associated with the same depth without having to traverse a pixel associated with a higher depth. Referring back to FIG. 8, it can be seen that the computing system could not traverse the depth map from a pixel of the first usable volume 810 to reach the second usable volume 812 without traversing a pixel of a higher depth. Therefore, the computing system can determine that there is more than one portion of usable space displayed in the depth map.

FIG. 9 illustrates an example process flow for machine learning image-based estimation of container fullness, according to embodiments of the present disclosure. Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. At 902, the method can include a computing system receiving, from an image-capturing device. The two-dimensional image of a container can include a first compressible item. In some instances, the computing system can cause the image-capturing device to capture the two-dimensional image of the container between the source location and the target location (e.g., along a conveyor belt).

At 904, the method can include the computing system generating a depth map using a monocular depth estimation (MDE) model based at least in part on the two-dimensional image. The depth map can include depth information of a surface profile of the first compressible item.

At 906, the method can include the computing system generating a three-dimensional representation comprising points associated with the container based at least in part on the depth map.

At 908, the method can include the computing system generating a voxel grid with volumes associated with the points based at least in part on the three-dimensional representation.

At 910, the method can include the computing system determining a dimension for a voxel of the voxel grid.

At 912, the method can include the computing system determining a dimension of the container with respect to the image-capturing device.

At 914, the method can include the computing system determining a number of voxels included in the voxel grid that are associated with the first compressible item based at least in part on the surface profile and the dimension of the container.

At 916, the method can include the computing system determining a volume of the first compressible item based at least in part on the dimension of the voxel. The number of voxels describing the first compressible item, and the surface profile of the first compressible item. In some instances, an arrangement of the first compressible item forms a cavity, and wherein determining the volume of the first compressible item comprises determining a volume of the first compressible item and the cavity based at least in part on the surface profile of the first compressible item and the dimension of the container.

At 918, the method can include the computing system determining a fullness of the container based at least in part on a ratio of the volume of the first compressible item and a reference volume of the container.

At 920, the method can include the computing system comparing the fullness of the container to a target fullness.

At 922, the method can include the computing system determining whether the fullness of the container exceeds the target fullness based at least in part on the comparison.

FIG. 10 illustrates an example process flow for machine learning image-based estimation of container fullness, according to embodiments of the present disclosure. At 1002, the method can include a computing system receiving, from an image-capturing device, a first two-dimensional image of a container including a first item.

At 1004, the method can include a computing system determining, using a machine learning model, three dimensional information based at least in part on the two-dimensional image, the three dimensional information indicating a fullness of the container. In some instances, the computing system can use an MDE-based approach. In which case the computing system can generate a depth map for the container including the first item using the MDE model. The computing system can generate a three-dimensional representation of the container including the first item based at least in part on the depth map. The three-dimensional representation comprises the three dimensional information. The computing system can determine a volume of the first item based at least in part on the three-dimensional representation. The computing system can determine the fullness of the container based at least in part on a ratio of a volume of first item and a reference volume of the container.

In some instances, the computing system can use an end-to-end approach. In which case the computing system can determine, using an MDE model connected to a set of fully connected layers, a fullness of the container without explicit depth estimation and volume calculation.

At 1006, the method can include a computing system comparing the fullness of the container to a target fullness of the container.

At 1008, the method can include a computing system determining whether the fullness of the container exceeds the target fullness based at least in part on the comparison.

In some instances, the items are compressible, such that their volume can change. In these instances, the computing system can receive, from the image-capturing device, a second two-dimensional image of the container including the first compressible item and a second compressible item in physical contact with the first compressible item and compressing the first compressible item. The computing system can generate a depth map for the container including the first compressible item and the second compressible item using the MDE model. The computing system can generate a point cloud of the container including the first compressible item and the second compressible item. The computing system can determine an aggregate volume of the first compressible item and the second compressible item based at least in part on the point cloud. The computing system can determine the fullness of the container based at least in part on a ratio of the aggregate volume and the volume of the container while empty. The computing system can compare the fullness of the container in the container to a target fullness. The computing system can determine whether fullness of the container exceeds the target fullness based at least in part on the comparison.

FIG. 11 illustrates an example process flow 1100 for training a machine learning model for image-based estimation of container fullness, according to embodiments of the present disclosure. At 1102, a method can include a computing system receiving a first two-dimensional information of a container including a first item from a two-dimensional image-capturing device, the two-dimensional image-capturing device arranged at a first location.

At 1104, the method can include the computing system generating a machine learning model input based at least in part on the first two-dimensional information.

At 1106, the method can include the computing system determining, using a machine learning model, a first fullness of the container based at least in part on using the machine learning model input to generate a three-dimensional representation of the container and determine a first fullness of the container based at least in part on a ratio of a volume of first item and a reference volume of the container, the volume of the first item based at least in part on the three-dimensional representation.

The computing system can receive a second two-dimensional information from the image-capturing device at a second location. The image-capturing device at the first location can have a first field of view. The image-capturing device at the second location can have a second field of view. The computing system can generate second training data based at least in part on the second two-dimensional information. The computing system can determine a second fullness of the container based at least part on using the second two-dimensional information. The computing system can receive a ground truth fullness of the container based at least in part on a three-dimensional image from a second image-capturing device. The computing system can evaluate the first fullness and the second fullness based at least in part on the ground truth fullness.

Figure 12:
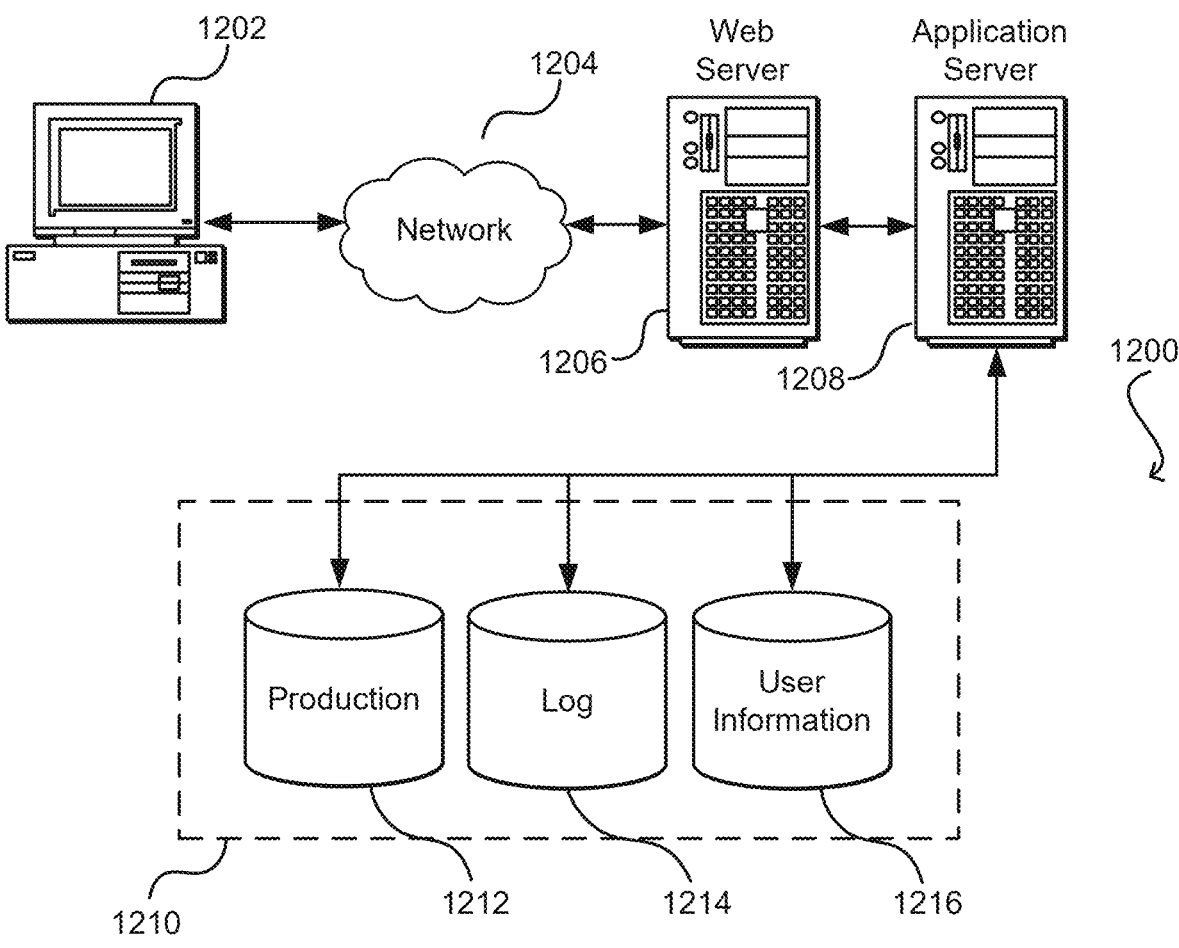
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1202. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1206 or other servers over the network 1204 or other networks.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing system, the method comprising:

receiving, from an image-capturing device, a two-dimensional image of a container including a first compressible item;

generating a depth map using a monocular depth estimation (MDE) model based at least in part on the two-dimensional image, the depth map including depth information of a surface profile of the first compressible item;

generating a three-dimensional representation comprising points associated with the container based at least in part on the depth map;

generating a voxel grid with volumes associated with the points based at least in part on the three-dimensional representation;

determining a dimension for a voxel of the voxel grid;

determining a dimension of the container with respect to the image-capturing device;

determining a number of voxels included in the voxel grid that are associated with the first compressible item based at least in part on the surface profile and the dimension of the container;

determining a volume of the first compressible item based at least in part on the dimension of the voxel, the number of voxels describing the first compressible item, and the surface profile of the first compressible item;

determining a fullness of the container based at least in part on a ratio of the volume of the first compressible item and a reference volume of the container;

comparing the fullness of the container in the container to a target fullness; and determining whether the fullness of the container exceeds the target fullness based at least in part on the comparison.

2. The method of claim 1, wherein an arrangement of the first compressible item forms a cavity, and wherein determining the volume of the first compressible item comprises determining a volume of the first compressible item and the cavity based at least in part on the surface profile of the first compressible item and the dimension of the container.

3. The method of claim 1, wherein the container is arranged on material handling equipment moving from a source location to a target location, wherein the method further comprises:

causing the image-capturing device to capture the two-dimensional image of the container between the source location and the target location, wherein the fullness of the container is determined between the source location and the targe location.

4. A computing system comprising:

one or more processors; and one or more computer-readable media including instructions that, when executed by the one or more processors, cause the one or more processors to:

cause an image-capturing device to capture a first two-dimensional image of a container in motion between a source location and a target location;

receive, from the image-capturing device, the first two-dimensional image of the container including a first compressible item;

determine, using a machine learning model, three-dimensional information based at least in part on the first two-dimensional image;

determine a volume of the first compressible item based at least in part on the three-dimensional information;

determine a fullness of the container based at least in part on the volume of the first compressible item;

compare the fullness of the container to a target fullness of the container; and determine whether the fullness of the container exceeds the target fullness based at least in part on the comparison, wherein the fullness of the container is determined while the container is between the source location and the target location.

5. The computing system of claim 4, wherein the machine learning model is monocular depth estimation (MDE) model, and wherein the one or more computer-readable media including instructions that, when executed by the one or more processors, further cause the one or more processors to:

generate a depth map for the container including the first compressible item using the MDE model; and generate a three-dimensional representation of the container including the first compressible item based at least in part on the depth map, wherein the three-dimensional representation comprises the three-dimensional information.

6. The computing system of claim 4, wherein the machine learning model comprises a transformer model, and wherein the one or more computer-readable media including instructions that, when executed by the one or more processors, further cause the one or more processors to:

determine, using an encoder and decoder of the transformer model, a fullness of the container without explicit depth estimation and volume calculation.

7. The computing system of claim 5, wherein the one or more computer-readable media including instructions that, when executed by the one or more processors, further cause the one or more processors to:

receive, from the image-capturing device, a second two-dimensional image of the container including the first compressible item and a second compressible item in physical contact with the first compressible item and compressing the first compressible item;

generate a depth map for the container including the first compressible item and the second compressible item using the MDE model;

generate a point cloud of the container including the first compressible item and the second compressible item;

determine an aggregate volume of the first compressible item and the second compressible item based at least in part on the point cloud;

determine the fullness of the container based at least in part on a ratio of the aggregate volume and the volume of the container while empty;

compare the fullness of the container in the container to a target fullness; and determine whether the fullness of the container exceeds the target fullness based at least in part on the comparison.

8. The computing system of claim 5, wherein the one or more computer-readable media including instructions that, when executed by the one or more processors, further cause the one or more processors to:

receive, from the image-capturing device, a video comprising a first two-dimensional images of the container including the first and a second two-dimensional image of the container including the first compressible item;

determine a first visibility of the container and the first compressible item and a second visibility of the container and the first compressible item; and select the first and a second two-dimensional image to use to generate the depth map based at least in part on the first visibility of the first compressible item.

9. The computing system of claim 5, wherein the depth map includes depth information of a surface profile of the first compressible item, and wherein the one or more computer-readable media including instructions that, when executed by the one or more processors, further cause the one or more processors to:

generate a voxel grid of the container including the first compressible item based at least in part on the three-dimensional representation;

determine a dimension of the container with respect to the image-capturing device; and determine a number of voxels of the voxel grid associated with the first compressible item based at least in part on the surface profile of the first compressible item and the dimension of the container, wherein the fullness of the container is based at least in a part on the number of voxels.

10. The computing system of claim 5, wherein the one or more computer-readable media including instructions that, when executed by the one or more processors, further cause the one or more processors to:

determine a container type of the container; and access a database of container types and identify a reference volume of the container is based at least in part on the container type, wherein the fullness of the container is based at least part on the reference volume.

11. The computing system of claim 5, wherein the one or more computer-readable media including instructions that, when executed by the one or more processors, further cause the one or more processors to:

determine a usable volume based at least in part the volume of the first compressible item and a reference volume of the container; and determine that the usable volume comprises a first sub-usable volume and a second sub-usable volume of usable space based at least in part on a relationship between a first pixel of the depth map associated with the first sub-usable volume and a second pixel associated with the second sub-usable volume.

12. The computing system of claim 11, wherein the one or more computer-readable media including instructions that, when executed by the one or more processors, further cause the one or more processors to:

determine whether a path from the first pixel of the depth map associated with the first sub-usable volume to second pixel associated with the second sub-usable volume without traverses a third pixel associated with the first compressible item, wherein determine that the usable volume comprises a first sub-usable volume and a second sub-usable volume of usable space is based at least in part on the determination.

13. One or more non-transitory computer-readable media including stored thereon a sequence of instructions that, when executed by one or more processors, causes the one or more processors to:

cause an image-capturing device to capture a first two-dimensional information of a container in motion between a source location and a target location:

receive the first two-dimensional information of the container including a first compressible item from the image-capturing device, the two-dimensional image-capturing device arranged at a first location;

generate a machine learning model input based at least in part on the first two-dimensional information; generate, using a machine learning model, a three-dimensional representation of the container based at least in part on the machine learning model input;

determine, using the machine learning model, a volume of the first compressible item based at least in part on the three-dimensional representation; and determine, using the machine learning model, a first fullness of the container based at least in part on the volume of the first compressible item, wherein the first fullness of the container is determined while the container is between the source location and the target location.

14. The one or more non-transitory computer-readable media of claim 13, wherein the instructions that, when executed by one or more processors, further cause the one or more processors to:

generate, using the machine learning model, a depth map of the container including the first compressible item based at least in part on the machine learning model input, wherein the depth map includes depth information of a surface profile of the first compressible item, and wherein the three-dimensional representation is based at least in part on the depth map; and determine the volume of the first compressible item based at least in part on the three-dimensional representation, wherein the first fullness of the container is based at least in a part on the volume.

15. The one or more non-transitory computer-readable media of claim 13, wherein the instructions that, when executed by one or more processors, further cause the one or more processors to:

generate a voxel grid of the container including the first compressible item based in part on the three-dimensional representation;

determine a dimension of the container with respect to the image capturing device; and determine a number of voxels of the voxel grid associated with the first compressible item based at least in part on a surface profile of the first compressible item and the dimension of the container with respect to the image-capturing device, wherein the volume of the first compressible item is based at least in a part on the number of voxels, wherein the first fullness of the container is based at least in a part on the number of voxels.

16. The one or more non-transitory computer-readable media of claim 13, wherein the machine learning model comprises a transformer model, and wherein the instructions that, when executed by one or more processors, further cause the one or more processors to:

determine, using an encoder and decoder of the transformer model, to determine the first fullness of the container without explicit depth estimation or volume calculation.

17. The one or more non-transitory computer-readable media of claim 13, wherein the instructions that, when executed by one or more processors, further cause the one or more processors to:

receive a second two-dimensional information from the image-capturing device at a second location, the image-capturing device at the first location having a first field of view, and the image-capturing device at the second location having a second field of view;

generate a second machine learning model input based at least in part on the second two-dimensional information;

determine a second fullness of the container based at least in part on using the second machine learning model input;

receive a ground truth fullness of the container based at least in part on a three-dimensional image from a second image-capturing device; and evaluate the first fullness and the second fullness based at least in part on the ground truth fullness.

18. The one or more non-transitory computer-readable media of claim 17, wherein the instructions that, when executed by one or more processors, further cause the one or more processors to:

determine a usable volume based at least in part the volume of the first compressible item and the volume of the container while empty; and determine that the usable volume comprises a first sub-usable volume and a second sub-usable volume of usable space based at least in part on a relationship between a first pixel of a depth map associated with the first sub-usable volume and a second pixel associated with the second sub-usable volume.

19. The one or more non-transitory computer-readable media of claim 18, wherein the instructions that, when executed by one or more processors, further cause the one or more processors to:

determine whether a path from the first pixel of the depth map associated with the first sub-usable volume to second pixel associated with the second sub-usable volume without traverses a third pixel associated with the first compressible item, wherein determine that the usable volume comprises a first sub-usable volume and a second sub-usable volume of usable space is based at least in part on the determination.

* * * * *